United States Patent [19]

Waldron

[11] 4,157,160
[45] Jun. 5, 1979

[54] NOZZLE ASSEMBLY AND PROCESS OF DISPERSING AN AEROSOL

[75] Inventor: David W. Waldron, Valdosta, Ga.

[73] Assignee: Lowndes Engineering Co., Inc., Valdosta, Ga.

[21] Appl. No.: 690,148

[22] Filed: May 26, 1976

Related U.S. Application Data

[63] Continuation-in-part of Ser. No. 618,739, Oct. 2, 1975, abandoned, which is a continuation-in-part of Ser. No. 419,925, Nov. 29, 1973, abandoned, and a continuation-in-part of Ser. No. 442,866, Feb. 15, 1974, abandoned, which is a continuation of Ser. No. 216,396, Jan. 10, 1972, abandoned, which is a continuation-in-part of Ser. No. 20,364, Mar. 17, 1970, Pat. No. 3,633,825.

[51] Int. Cl.² ................. A01N 17/02; B05B 7/00
[52] U.S. Cl. .................................... 239/8; 239/401; 239/406; 239/412; 239/417; 239/419; 239/424.5; 239/434.5
[58] Field of Search ................. 239/8, 11, 77, 400, 239/401, 403, 405, 406, 412, 416, 417, 419, 422, 424.5, 425, 426, 427.3, 428, 431, 434, 434.5; 43/125, 129, 132 A; 252/359 A, 359 CG

[56] References Cited

U.S. PATENT DOCUMENTS

| | | | |
|---|---|---|---|
| 1,098,429 | 6/1914 | Coleman | 239/416 |
| 2,959,214 | 11/1960 | Durr et al. | 239/77 X |
| 3,037,939 | 6/1962 | Andrews | 252/359 CG X |
| 3,462,950 | 8/1969 | Chevalaz | 239/412 X |
| 3,471,091 | 10/1969 | Baker | 239/416 |
| 3,633,825 | 1/1972 | Waldron | 239/405 X |
| 3,702,306 | 11/1972 | Waldron | 252/359 A X |

*Primary Examiner*—Robert B. Reeves
*Assistant Examiner*—Andres Kashnikow
*Attorney, Agent, or Firm*—Newton, Hopkins & Ormsby

[57] ABSTRACT

A nozzle assembly in which the nozzle closes the end of angularly disposed air ducts, the nozzle having a central axial air passageway and a plurality of radially directed air passageways, the radially directed air passageways converging in arcuate paths toward the axis of the central passageway. Elements defining the central passageway are movable toward and away from each other to provide for a variable annular opening through which liquid, such as a pesticide, is introduced into the axial passageway and discharged with the air as a fog. In one embodiment of the invention, a motor controls the positioning of one element defining the central air passageway.

15 Claims, 6 Drawing Figures

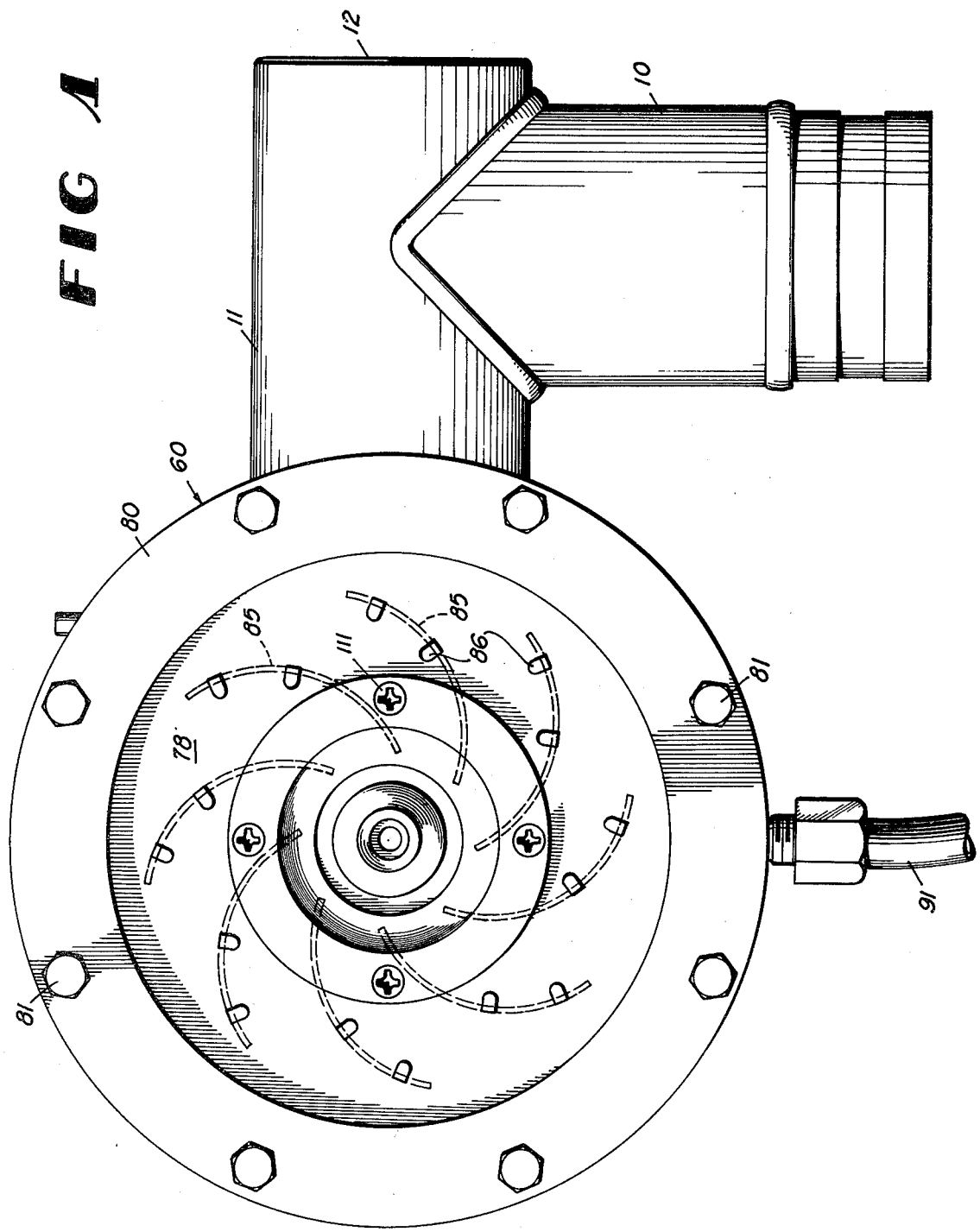

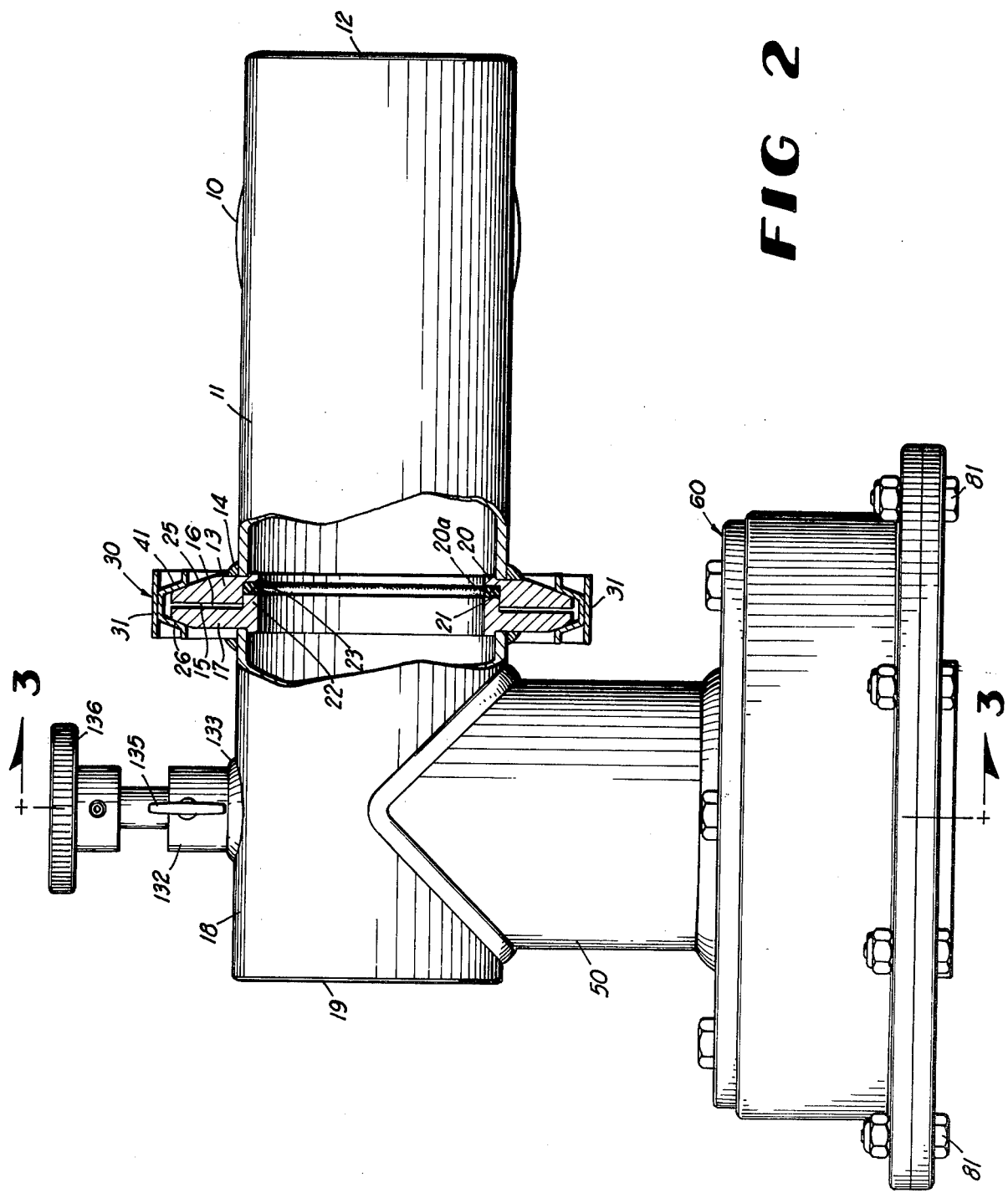

4,157,160

NOZZLE ASSEMBLY AND PROCESS OF DISPERSING AN AEROSOL

CROSS-REFERENCE TO RELATED APPLICATIONS

This invention is a continuation-in-part of application Ser. No. 618,739, filed Oct. 2, 1975 (now abandoned) which was a continuation-in-part of application Ser. No. 419,925, filed Nov. 29, 1973 (now abandoned) and is a continuation-in-part of application Ser. No. 442,866, filed Feb. 15, 1974, (now abandoned) which was a continuation of Ser. No. 216,396, filed Jan. 10, 1972 (now abandoned) which was a continuation-in-part of application Ser. No. 20,364, filed Mar. 17, 1970, now U.S. Pat. No. 3,633,825.

BACKGROUND OF THE INVENTION

1. Field of the Invention

This invention relates to an improved nozzle assembly and process of dispersing an aerosol and is more particularly concerned with a nozzle assembly in which the feed of liquid, such as a pesticide, can be remotely controlled and to the process carried out by such nozzle.

2. Description of the Prior Art

As pointed out above, I have heretofore obtained U.S. Pat. No. 3,633,825, for "A Fogging Apparatus" which is provided with a nozzle having a central passageway through which air passes and converging circumferentially spaced arcuate air passageways which are directed toward the axis of the central passageway so as to impart a swirling motion to the air emerging from the nozzle. Minute quantities of liquid are introduced through a radially disposed annular opening which feeds the liquid to the central passageway.

SUMMARY OF THE INVENTION

Briefly described, the present invention includes a nozzle quite similar to the nozzle disclosed in U.S. Pat. No. 3,633,825; however, the elements which define the liquid passageway are movable with respect to each other so as to create a larger or smaller opening in accordance with the amount of liquid to be delivered to the central passageway. One of the elements is stationary and the other of the elements is movable toward and away from the stationary element, the movement of the movable element being controlled remotely through a motor which moves the movable element, in one embodiment of the invention. In another embodiment of the invention, the movable element is manually adjustable toward and away from the stationary element.

BRIEF DESCRIPTION OF THE DRAWING

FIG. 1 is a front elevational view of a nozzle assembly constructed in accordance with the present invention, the broken lines showing the arcuate vanes which define the converging air passageways;

FIG. 2 is a top plan view of the nozzle assembly depicted in FIG. 1, portions thereof being broken away to show the interior of the air duct coupling;

FIG. 4b is a cross sectional view similar to FIG. 3b and showing the remainder of the modified nozzle assembly depicted in FIG. 4a.

DESCRIPTION OF THE PREFERRED EMBODIMENTS

Figure 3A:
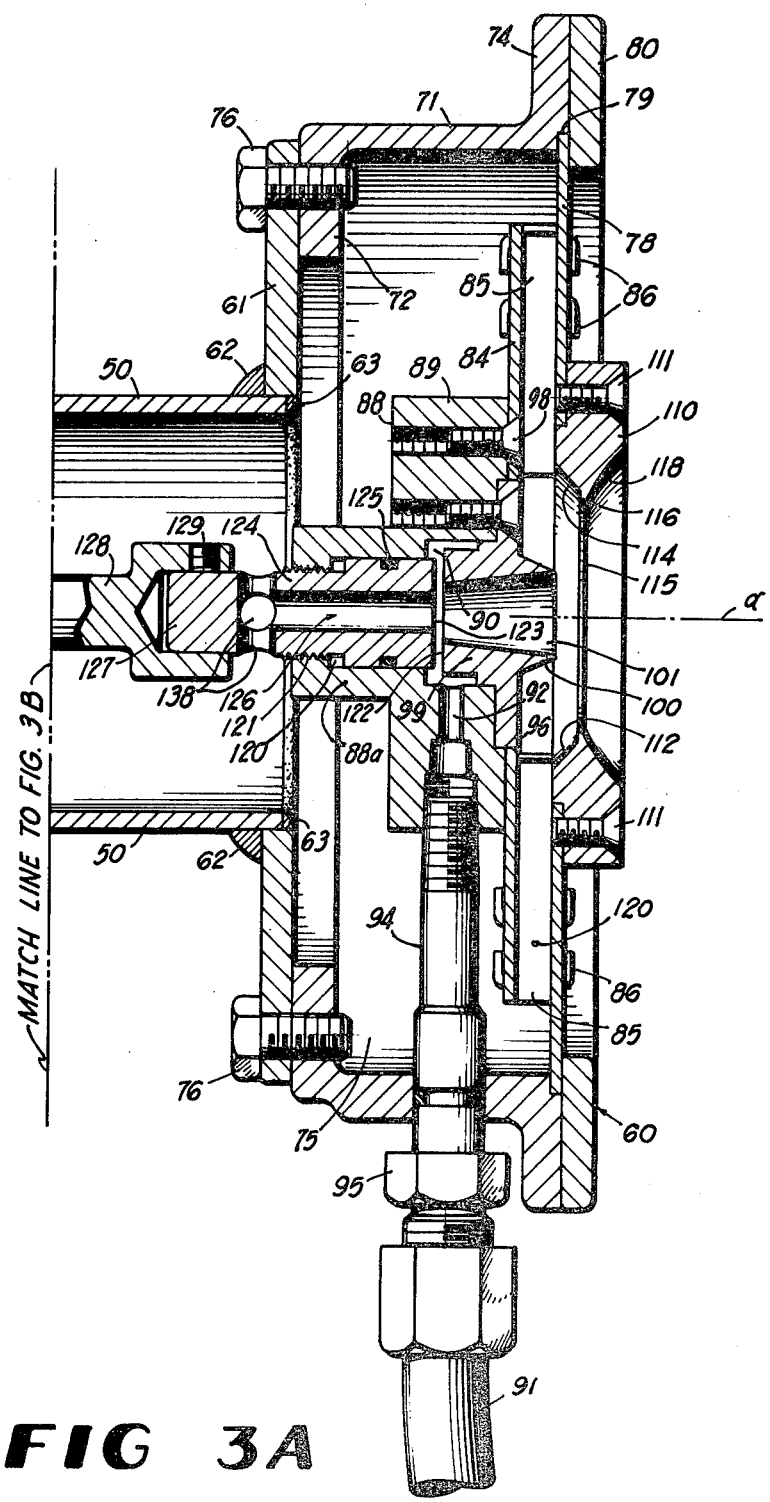
FIG. 3a is a cross sectional view taken substantially along line 3—3 in FIG. 2 and showing a portion of the nozzle assembly depicted in FIGS. 1 and 2.

Referring now in detail to the embodiments chosen for the purpose of illustrating the present invention, and particularly to FIGS. 1, 2, 3a and 3b, numeral 10 denotes generally an upstanding air duct which leads from an air plenum chamber (not shown) to which air under pressure is fed by an air impeller or compressor (not shown). Thus, the duct provides a means of supplying air under pressure or compressed air to the nozzle assembly to be described hereinafter. It will be understood by reference to U.S. Pat. Nos. 3,893,622 and 3,633,825 that the duct 10 is rotatably carried by an upstanding duct which leads from the plenum chamber and the air compressor, so that duct 10 can be rotated about its axis. The duct 10 communicated with one side of an air duct 11, the axis of the air duct 10 and the air duct 11 being disposed in perpendicular relationship to each other. The end of air duct 11 is closed by an end plate 12 while the open other end of air duct 11 is provided with an annular flange 13 secured to the end of duct 11 by welding, denoted generally by numeral 14. The flat radially disposed surface 15 of the annular flange 13 receives the flat annular surface 16 of an abutting flange 17. The flange 17 is provided on the inner end of an air duct 18 which is disposed in coaxial relationship in alignment with the air duct 11. The ducts 11 and 18 are hollow cylindrical members of the same diameter. The outer end of duct 18 is closed by a cap 19.

The inner portion of annular flange 13 is provided with an annular inwardly protruding lip 20 which receives an O-ring 21 against its outer flat radial surface. The inner portion of the annular flange 17 is provided with a rearwardly protruding annular sleeve 22 which is slidably received within the inner periphery of the flange 13 and is movable against the O-ring 21 so as to sandwich the O-ring between the outer annular surface 23 of sleeve 22 and the outer surface 20a of the lip 20. The O-ring 21, when not under compression, provides a spacing between the surfaces 23 and 20a sufficient to space the faces 15 and 16 of the flanges 13 and 17 apart, as shown in FIG. 2.

The rear portions of flanges 13 and 17 are respectively provided with annular tapering surfaces 25 and 26. These annular surfaces converge or taper outwardly, as seen best in FIG. 2. Surrounding the outer periphery of the abutting flanges 13 and 17 is a compression sleeve denoted generally by numeral 30. This compression sleeve includes an annular hollow cylindrical shield 31 which extends almost entirely around the outer periphery of the two flanges 13 and 17; however, as seen in FIG. 3b, the ends 32 of the shield 31 terminate in opposed spaced relationship to each other. Outwardly protruding opposed pairs of brackets 33a and 33b. The bracket 33a receives a cross bar 34, the central portion of which is secured to a tie bolt or shaft 35, the end portion of which is externally threaded to provide threads 36. The threads 36 are threadedly received into the interior of a clamping nut 37, the end portion of the nut 37 being provided with a tightening handle 38. A slidable sleeve 39 is provided between the nut 37 and the cross bar 34 and outwardly protruding pins 40 extend from the sleeve 39 and are received by the brackets 33b. Thus, upon tightening of the nut 37, the effective length of the strap 31 will be reduced.

The inner periphery of strap 31 is provided with an annular U-shaped camming member 41 which has inwardly diverging surfaces for engaging the surfaces 25 and 26 of the flanges. Thus, upon tightening of the nut 37, the strap 31 will draw the camming member 41 inwardly so as to urge the flanges 13 and 17 toward each other against the resiliency of the O-ring 23. The camming member 41 circumscribes substantially the entire periphery of the flanges 13 and 17; however, the ends 43 of the camming member are in spaced opposed relationship as shown in FIG. 3b, these ends being offset circumferentially of the ends 32 so that one end portion of the strap 31 overlies both ends 43 of the camming member, as seen in FIG. 3b.

Extending sidewise from the duct 18 is a third air duct 50, the distal end portion of which carries the nozzle assembly 60. For this purpose, the outer end portion of the duct 50 is provided with an annular flange secured thereto by welds 62 and 63, the annular flange extending radially outwardly from the end portion of duct 50.

Figure 3B:
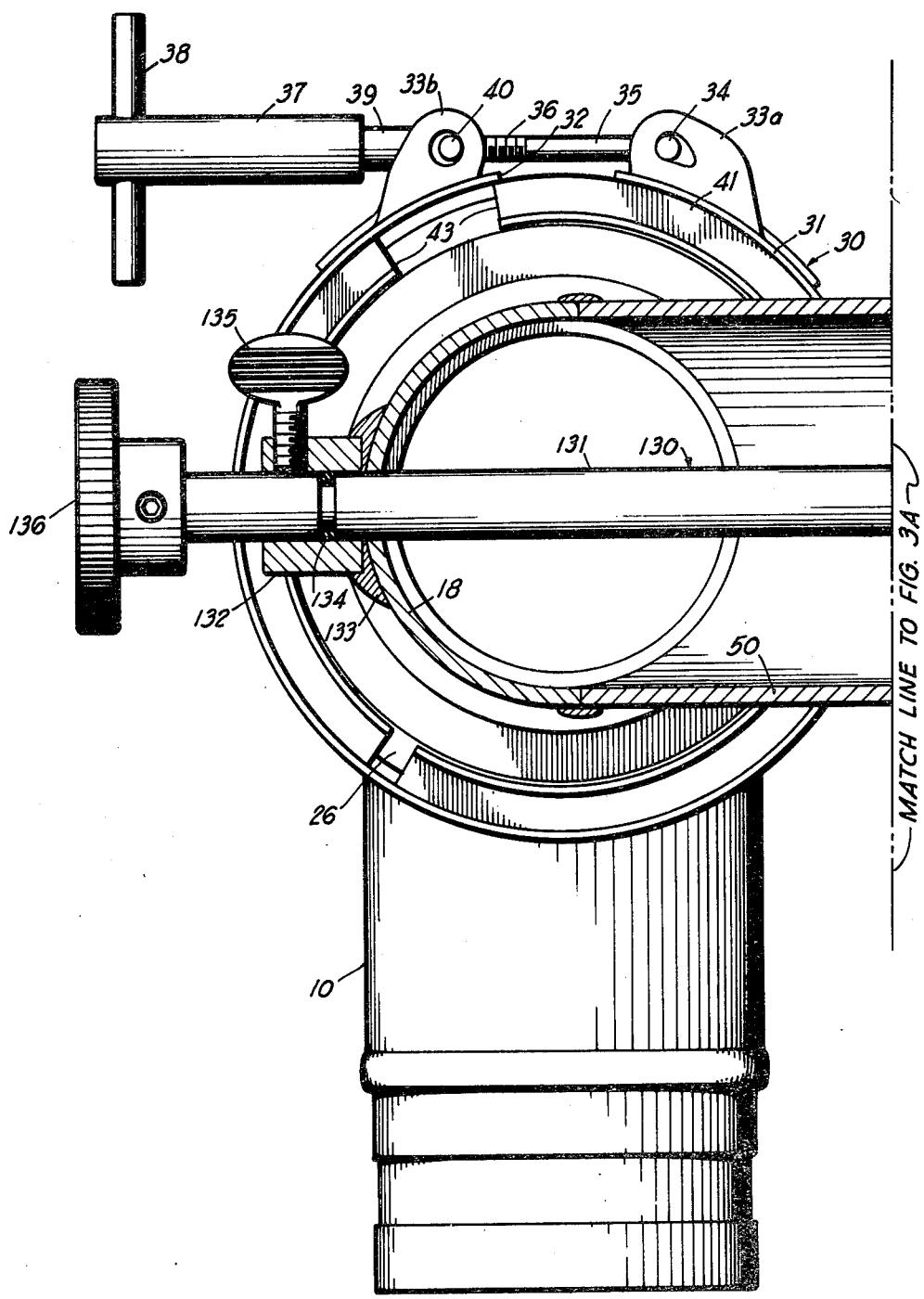
FIG. 3b is a cross sectional view taken substantially along line 3—3 in FIG. 2 and showing the remainder of the fogging nozzle assembly depicted in FIGS. 1 and 2.

Referring more specifically to FIGS. 1, 2 and 3a, it will be seen that the nozzle assembly 60 includes an annular housing 71 having an inwardly directed mounting flange 72 at the left or inlet end as seen in FIG. 3a and an outwardly directed positioning flange 74 at the discharge or right end thereof as seen in FIG. 3a. The housing 71 defines an air receiving chamber 75 therein closed at the inlet end thereof by mounting flange 61 and partially closed at the discharge end thereby by an annular positioning plate 78. Bolts 76 secure the flange 72 to flange 61. The positioning plate 78 is received in an appropriately formed recess 79 in the forward edge of housing 71 and is retained in position by a retaining ring 80 connected to the positioning flange 74 of housing 71 by nut and bolt assemblies 81. The positioning plate 78 is washer-shaped providing a central aperture therethrough.

A secondary positioning plate 84, which is also washer shaped but having a smaller outside and inside diameter, is positioned behind the plate 78 toward the inlet side of the housing 71 behind a plurality of arcuate shaped vanes 84 which are arranged along a spiral path relative to the axis of the nozzle assembly 30. The vanes 85 are connected to plates 78 and 84 through locking tabs 86. The inside passage through second positioning plate 84 is closed by a mounting block 88 connected to plate 84 by screws 89 and extending from plate 84 into the chamber 75 toward the inlet end of housing 71.

The mounting block 88 is annular and is provided with a smaller concentric rearwardly extending annular socket member 88a, the inner end of which terminates within the confines of flange 61. Socket member 88a is provided with a central cylindrical bore 120 and its inner end is countersunk to provide an internally threaded hole 121. The bore 120 is concentrically disposed with and communicates with the central cylindrical fluid recess or passageway 90 within block 88.

A hose 91 supplies fluid, i.e. insecticide from a source of fluid under pressure, to recess 90 in the block 88 through appropriate fitting, such as upstanding tube 94, threadedly connected to block 88 and a passageway 92 in block 88. The lower end of tube 94 protrudes outwardly through housing 71 and is connected to hose 91 through fitting 95. Therefore, it will be seen that fluid supplied through the hose 91 will be supplied to the recess 90.

An annular nozzle plate 96, having an outside diameter coinciding with the inside diameter of the plate 84, is received in a positioning recess in the face of the block 88 adjacent to the discharge side of the housing 71 partially closing the recess 90 in block 88. The nozzle plate 96 is maintained in a fixed or stationary position on the block 88 by a plurality of screws 98. The nozzle plate 96 defines a central nozzle element 99 extending from one side of the plate 96 inwardly into recess 90 and has an outside diameter slightly less than the inside diameter of the recess 90. The nozzle element 99 is integral with the plate 96 and is concentrically located with respect to the recess 90 when the plate 96 is in position. The outside of the plate 96 adjacent to discharge side of housing 71 includes a tapered conical nozzle surface 100 which extends from the plate 96 toward the discharge side of housing 71 and is concentrically located about axis a.

The outer peripheral surface of nozzle element 99 is of approximately the same diameter as the recess 90 and thus forms a plug which closes the outer open end of recess 90; however, the inner peripheral portion of nozzle element 99 is of reduced diameter so as to define with nozzle 99 a central annular reservoir, i.e. annular recess 90, which receives the liquid from passageway 92.

The nozzle plate 96 and the central nozzle element 99 are provided with a central, axially extending opening or passageway therethrough, which forms a mixing and discharge throat 101 along axis a defined by a conical central surface which diverges outwardly.

The nozzle element 99 has a flat radially extending rear end surface 122 which forms a liquid control surface and against or adjacent which a flat radial front liquid control surface 123 of a slidable and rotatable liquid control element 124 abuts. The liquid control element 124, itself, is a hollow, tubular member having a cylindrical forward periphery with a peripheral groove receiving an O-ring 125. The rear portion of the control element 124 is of reduced diameter and is externally threaded so as to be threadedly received by internal threads 121. By rotation of the control element 124, the control element 124 can be incrementally moved toward and away from the nozzle element 99 so that the annular space between surfaces 122 and 123 can be progressively varied, as desired. Thus, the mounting block 88, including its socket 88a, form a journal which receives the control element 124.

Aligned coaxially with the mixing and discharge throat 101 is a central straight cylindrical air passageway 126 which extends along axis a throughout substantially the length of element 124 for the purpose of discharging air into the inner end of the throat 101. The diameter of air passageway 126 is slightly less than the diameter of the smaller inner end of throat 101.

The control element 124 extends through and outwardly, i.e. rearwardly, of the rear portion of socket member 88a and is provided with a square control head 127 at its rearmost portion. The head 127 is removably received in the recess of a square socket 128 on one end of a control rod 130, the head 127 and socket 128 being secured together by a set screw 129.

The body or shank 131 of the control rod 130 is cylindrical and extends rearwardly along axis a throughout the length of duct 50, passing radially across duct 18 and outwardly through its far side. A journal 132, seen in FIGS. 2 and 3b, is welded, by weld 133, to the side of duct 18 and the shank 131 passes through this journal 132. An O-ring 134 in a peripheral groove in shank 131 seals the passageway of journal 132 and a set screw 135, passing through journal 132, locks the shank 131 against inadvertent rotation.

A knurled disc shaped knob 136 on the end of shank 131 permits manual rotation of shank 131, when set screw 135 is loosened.

Between the socket 127 and the threads 121, the control element 124 is provided with circumferential spaced, radially disposed holes 138 which communicate with the inner end of air passageway 126 so as to introduce air from duct 50 into passageway 126.

Secured to the front portion of the positioning plate 78 is an annular deflection member 110, the central opening of which surrounds the stream emerging from nozzle element 99 and is forwardly of the nozzle element 99. Thus, the deflection member 110 reduces the effective diameter of the central aperture of plate 78. The deflection member 110 overlaps the inner portion of plate 78 and is maintained in position by screws 111 engaging plate 78 and positioning the member 110 so that the inside surface of member 110 is in alignment with the forward surfaces of vanes 85. Member 110 is provided with an inwardly and forwardly extending rear annular surface 112 which commences adjacent the inner ends of vanes 185 and extending forwardly and toward axis α tapering with surface 112 so as to terminate in an annular edge 116 for defining a front central opening 115 for the nozzle, spaced forwardly of nozzle element 99.

SECOND EMBODIMENT

Figure 4A:
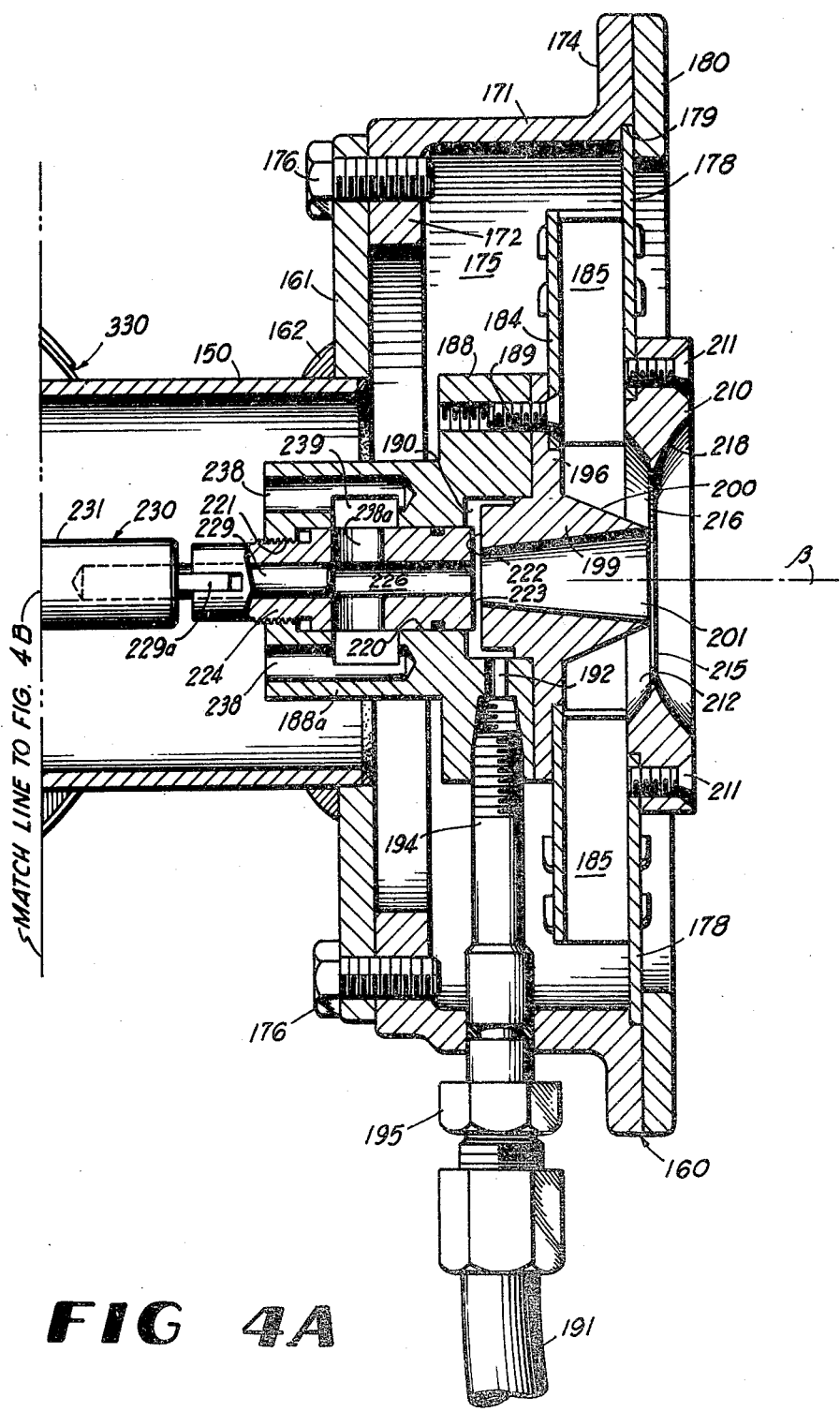
FIG. 4a is a view similar to FIG. 3a but showing a modified form of the present invention.
Figure 4B:
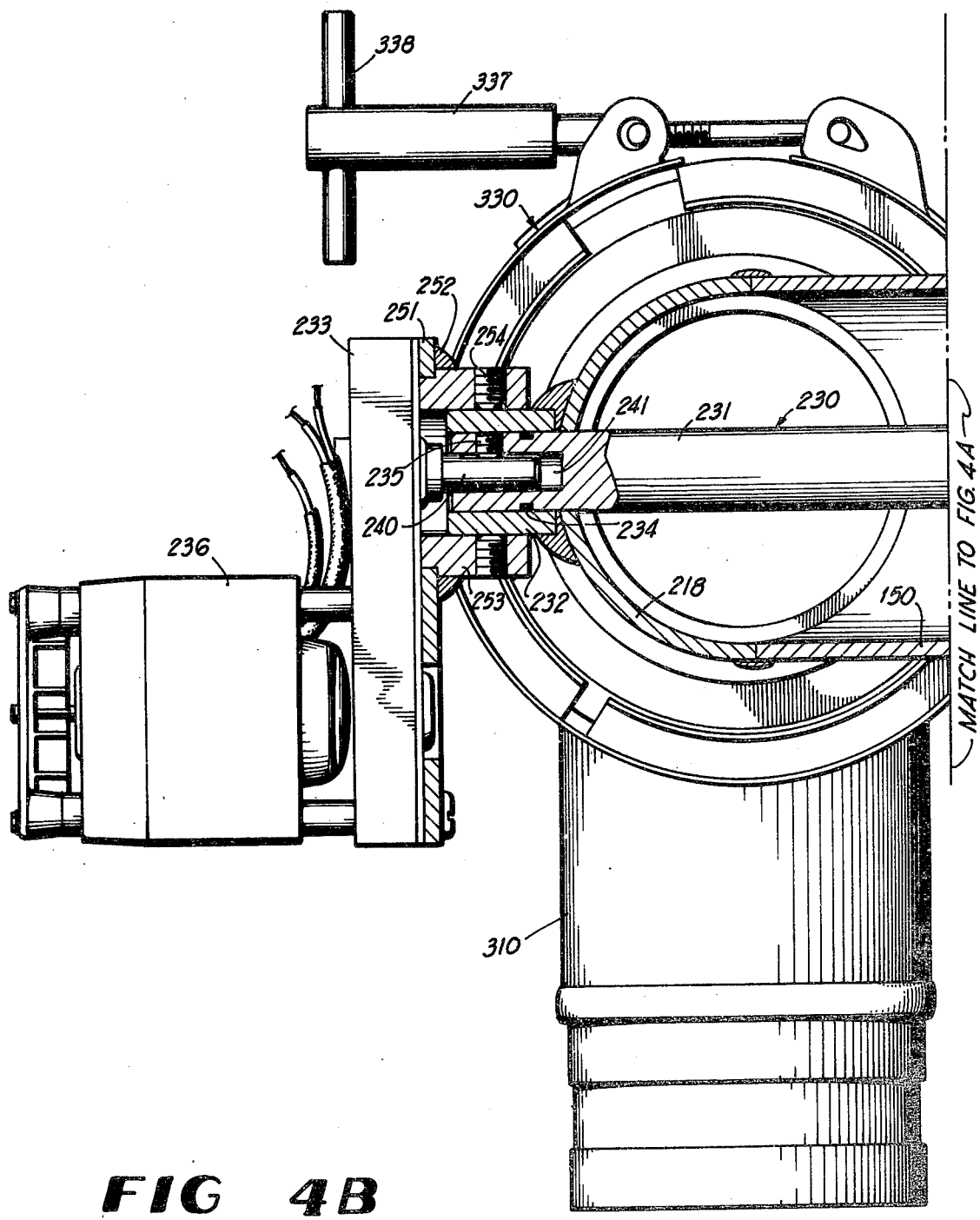

In the modified form of the present invention as depicted in FIGS. 4a and 4b, the modified nozzle assembly 160 includes an annular housing 171 having an inwardly directed mounting flange 172 and an outwardly directed positioning flange 174. The housing 171 defines an air receiving chamber 175. The housing 171 is carried by a flange 161 secured to a conduit 50 by welds 162. Bolts 176 secure the housing 171 to flange 161. A positioning plate 178 is received in an annular recess 179 along the front of the housing 171. The plate 178 is retained in place by a retaining ring 180.

A secondary flat, annular positioning plate 184 is disposed rearwardly of and parallel to the plate 178. Between the plates 178 and 184 are a plurality of arcuately shapes vanes 185 which are arranged in circumferentially equally spaced relationship so as to define a plurality of arcuate converging spiral shaped passageways through which air passes toward the center discharge end of the nozzle. The plate 184 is substantially smaller than the plate 178 so that air in the chamber 175 passes around the periphery of the plate 184 and through the passageways defined by the vanes 185.

Rearwardly of the secondary plate 184 is a disc shaped mounting plate 196. Rearwardly of the disc shaped mounting plate 196 is a disc shaped mounting block 188. Bolts 189 secure the mounting plate 196 and the mounting block 188 against each other and the mounting plate 196 against the annular secondary plate 184.

The rear portion of the mounting block 188 is of reduced diameter to provide an annular socket for carrying the control element 224. The socket member 188a is provided with a central cylindrical bore 220, the end of which is countersunk to provide internal threads 221.

A hose 191 supplies fluid, that is insecticide, from a source of fluid under pressure to recess 190 in block 188 through tube 194, the tube being threadedly received within the bottom portion of the block 188. The tube 194 is threaded at its upper end portion and is received in the block 188 so as to communicate with the passageway 192 leading to the recess 190. The lower end of the tube protrudes through housing 171 and is connected by fitting 195 to the hose 191.

The annular nozzle plate 196 carries in its central portion a central nozzle element 199 provided with a conical or tapered central bore or throat through which both fluid and air emerge.

The forward portion of the nozzle element 199 has a tapered conical outer surface 200 which forms a nozzle flange extending forwardly and inwardly toward the discharge opening and axis β. The tapered surface 200 is inwardly of the mouths of the passageways defined by the vanes 185 so that air passing through the passageways of vanes 185 will impinge upon the tapered surface 200 and be directed outwardly therefrom. The nozzle element 199 extends rearwardly of the nozzle plate 196 and is snugly received in the front portion of the recess 190. Rearwardly of the snugly received portion, the rear end portion of the nozzle element 199 is of reduced diameter so that the recess 190 of the block 188 is annular in shape but has a radially extending portion defined by the rear radial surface 222 of the nozzle element 199 and the inner surface defining the recess 190.

Secured to the front portion of the positioning plate 178 is an annular deflection member 210, the central opening of which surrounds the mouth of the nozzle element 199. It is thus seen that the deflection member 210 reduces the effective diameter of the central aperture therethrough. The deflection member 210 is maintained in position by screws 211 engaging plate 178 and positioning the member 210 so that the inside surface of member 210 is in alignment with the forward surfaces of vanes 185. Member 210 is provided with an inwardly and forwardly extending annular rear surface 212 commencing adjacent the inner ends of vanes 185 and extending forwardly and toward axis β to terminate in surrounding relationship to the tip of nozzle element 199. In like fashion, the front surface 218 converges inwardly and rearwardly toward axis β so as to define with surface 185 an annular edge 216 surrounding the tip of the nozzle element 199 and providing a front opening 215 larger than the mouth of throat 201.

The control element 224 is a cylindrical member having an annular sealing ring or O-ring 250 received in an annular groove in the forward portion of the control element 224. An intermediate portion of the control element 224 is of reduced diameter and is provided with external threads 251 w˙ich mesh with the threads 221 so that upon rotation of the control element 224 the control element will be moved forwardly and rearwardly within the confines of the block 188 and the socket member 188a so as to move the front radial surface 223 toward and away from the rear radial surface 222 of the nozzle element 199.

The rear portion of socket 188a is provided with a plurality of axially extending circumferentially spaced air passageways 238 which lead from the rear surface of the socket member 188a. All of the air passageways 238 communicate with a cylindrical air chamber 239 which, in turn, communicates with a radial bore which forms an air passageway 238a leading to the rear portion of a central air passageway 226 disposed axially along the centerline of the control element 224.

The passageway 226 is in coaxial alignment with the throat 201, so that the forward end of the passageway 226 empties into the throat 201. The inner diameter of throat 201 is of larger diameter than the diameter of air passageway 226.

The air passageway 226 extends throughout the liquid control element 224; however, the rear end portion of this passageway 224 is plugged by a cylindrical pin 229 which is keyed into the rear portion of control element 224 by a transverse key 229a. The pin 229a extends into the end of a control rod denoted generally by numeral 230, the control rod having a shank 231 which extends rearwardly through a journal 232 mounted on the side of pipe or duct 218. The duct 218 is identical to the duct 18 while duct 150 is identical to duct 50, except insofar as the nozzle assembly 60 and its control mechanism is concerned. A sealing ring 234 received within a peripheral groove in the end portion of the shaft, rod, body or shank 231 seals the leakage of air from pipe 218.

A motor 236 which is mounted on a gear box 233 drives, through an appropriate gear reducing train (not shown) within the gear box 233, a drive shaft 240. The drive shaft 240 protrudes forwardly from gear box 233 and is received within a hollow bore 241 in the end of shank 231. A set screw 235 locks the shaft 242 to the shank 231.

The gear box 233 is mounted on a flat panel 251, to which is welded by weld 252, a collar or sleeve 253. The sleeve 253 surrounds and is concentric with the shaft 240 and slides on and off the periphery of the journal 232. Set screws 254 lock the sleeve 253 onto the journal 232.

Motor 236 is a reversible motor and, hence, upon rotation of the motor 236 in one direction, the shaft 240 drives shank 231 in one direction and when the motor 236 is driven in the opposite direction, the shaft 240 will drive shank 231 in an opposite direction. Thus, the motor 236 will control the rotation of liquid control element 224 so as to move the surface 223 toward or away from the surface 222, as desired.

A handle 338 on nut 337 permits the tightening or loosening of a clamp 330 so as to permit the duct 218 to be rotated with respect to a companion duct carried by duct 310. The structure of the clamp 330 is identical to the structure of clamp 30 and hence no more detailed description is required.

OPERATION AND METHOD

From the foregoing description, the operation of the present devices should be apparent. Air from an air compressor or blower is introduced through the duct 10 to the duct 11 and thence through duct 18 to duct 50. The ducts 10 and 11 are disposed perpendicularly to each other while the ducts 18 and 50 are disposed perpendicularly to each other. The nozzle 60 is disposed radially across the end of the duct 50. Therefore, the air passing outwardly through duct 50 passes into the chamber 75 of the nozzle assembly 60. Thence, the air passes adjacent the periphery of the housing 71 and enters the arcuate air passageways 120 defined by the arcuate vanes 85. The arcuate vanes 85 converge toward the nozzle element 96 so as to direct the air in an arcuate path inwardly, thereby generating a swirling action of the air which, as the air emerges from the various circumferentially spaced air passageways 120, impinge upon the conical surface 100 of the nozzle element, thereby being directed outwardly through the aperture 115.

Simultaneously, air is introduced through the air passageways 138 and thence through the axially disposed air passageway 88a. From the mouth of the passageway 88a, air is discharged into the inlet of the axial throat 101 and thence is discharged out of the outlet or mouth of throat 101.

While the air is being discharged both through the central passageways 88a and 101 and through the radial passageways 120, liquid under pressure is introduced through the holes 91 and up through the pipe 94 and the passageway 92 into the annular space surrounding the opening between the faces 123 and 122. This liquid then moves radially inwardly through this opening and is introduced circumferentially around the inlet of the axial passageway 101 so as to be carried as a film along the wall of the throat 101 outwardly to the outlet or mouth of this throat 101. As the liquid moves outwardly, the circumference of the liquid progressively increases as the cross sectional area subtended by the conical passageway increases, thereby causing the film of liquid to become progressively stretched circumferentially and to thereby be narrowed in thickness. Thus, a very thin film reaches the mouth of passageway 101 whence it is swept or sheared off of the annular rim or edge of the nozzle element 96 by the swirling air discharged from the passageways 120.

By the manipulation of the control rod 130, that is through rotation of the handle 136, the position, axially of the liquid control element 124, may be varied, due to its threaded engagement with the socket 88a. Hence, the annular radially disposed opening between the surfaces 122 and 123 can be infinitely varied, as desired. Therefore, the volume of liquid delivered to the nozzle can be varied, as desired, and compensation can be made for the change in viscosity of the liquid.

In the embodiment of FIGS. 4a and 4b, the nozzle assembly 160 operates in substantially the same way as nozzle assembly 60; however, it is noted that the air passageways 239 and 238 are within the confines of the socket 188a and the manipulation of the control rod 230 is through a motorized gear box arrangement depicted in FIG. 4b. The motor 236 drives the rod 230 in one direction or the other so as to rotate the liquid control element 224 for varying the opening between the surfaces 222 and 223, as desired.

Of course, if it is desired to pivot the nozzle 60 or 160 upwardly or downwardly, the nut 37 or 137 is manipulated so as to loosen the clamping member 30 to permit such readjustment. Upon retightening of the nut 37 or 337, the nozzle 60 or 160 is locked in position with respect to the duct 11.

I claim:

1. Process of producing an aerosol mixture of a liquid and air comprising:
    (a) passing a first stream of air along a passageway defined by a conical wall which wall progressively diverges from a relatively small inlet to a relatively large outlet;
    (b) introducing liquid circumferentially to said inlet so that increments of the liquid form a film which clings to said wall and is progressively moved along said wall toward said outlet, cross sectional increments of said film on said wall progressively becoming of larger diameter to thereby reduce the thickness of the film; and (c) passing a separate stream of air adjacent to the outlet of said passageway to entrain the film of emerging liquid and for admixing with air emerging from said outlet, said second stream of air including a plurality of inwardly directed streams which move in arcuate paths so as to spiral outwardly adjacent said outlet.

2. The process defined in claim 1 in which said liquid is passed radially inwardly in an annular inwardly directed path toward said inlet for being introduced therein.

3. The process defined in claim 2 wherein said annular inwardly directed path is defined by a pair of radial surfaces which are disposed adjacent to each other and wherein one of said radial surfaces is moved with respect to the other of said radial surfaces for varying the quantity of liquid introduced to said inlet.

4. A nozzle assembly for generating an aerosol mixture of air and a liquid comprising:
 (a) a source of air under pressure;
 (b) a housing into which said air under pressure is introduced, said housing having an aperture through which the mixture of air and liquid is discharged;
 (c) a nozzle element in said housing adjacent to said aperture, said nozzle element having an axial passageway therethrough and a liquid control surface;
 (d) a liquid control element for said nozzle element, said liquid control element having a liquid control surface cooperating with the liquid control surface of said nozzle element and movable with respect to each other for varying the effective opening between the aforesaid control surfaces, said opening providing a pathway for liquid into said passageway of said nozzle element;
 (e) a source of liquid under pressure communicating with said opening;
 (f) said liquid control element being provided with an air passageway, the discharge end of which is in alignment with the intake end of said axial passageway in said nozzle element, the intake end of said air passageway being in communication with said air under pressure for directing an air discharge from said discharge end through said axial passageway and for entraining liquid from said opening in said air discharge;
 (g) means interconnected between said liquid control element and said nozzle element for manipulating said liquid control element and said nozzle element with respect to each other for incrementally varying the size of the opening between said liquid control surfaces during the operation of the nozzle assembly; and
 (h) a plurality of radially disposed converging air passageways disposed circumferentially around the axis of said nozzle element, said air passageways communicating with said housing for directing air under pressure from said housing toward said nozzle element.

5. The nozzle assembly defined in claim 4 wherein said control surfaces are disposed in radial planes opposed axially with respect to each other, the movement of said surfaces being axially toward and away from each other when the opening between said control surfaces is varied.

6. The nozzle assembly defined in claim 5 wherein said nozzle element is fixed with respect to said housing and wherein the movement of said surfaces includes said liquid control element being movable toward and away from said nozzle control element.

7. The nozzle assembly defined in claim 4 wherein said nozzle element is fixed with respect to said housing and the movement of said elements includes said liquid control element being movable with respect to said nozzle element and including a control rod connected to said control element and projecting from said housing and a knob on said control rod for manipulation of said control element by means of said control rod.

8. The nozzle assembly defined in claim 4 including a block defining an annular liquid reservoir surrounding said opening, said liquid control element protruding through and out of said block, there being provided air passageways communicating with said air passageway of said liquid control element for directing a portion of said air under pressure into the air passageway of said liquid control element and thence through the axial passageway of said nozzle element.

9. A nozzle assembly for generating an aerosol mixture of air and a liquid comprising:
 (a) a source of air under pressure;
 (b) a housing into which said air under pressure is introduced, said housing having an aperture through which the mixture of air and liquid is discharged;
 (c) a nozzle element in said housing adjacent to said aperture, said nozzle element having an axial passageway therethrough and a liquid control surface;
 (d) a liquid control element for said nozzle element, said liquid control element having a liquid control surface cooperating with the liquid control surface of said nozzle element and movable with respect to each other for varying the effective opening between the aforesaid control surfaces, said opening providing a pathway for liquid into said passageway of said nozzle element;
 (e) a source of liquid under pressure communicating with said opening;
 (f) said liquid control element being provided with an air passageway, the discharge end of which is in alignment with the intake end of said axial passageway in said nozzle element, the intake end of said air passageway being in communication with said air under pressure for directing an air discharge from said discharge end through said axial passageway and for entraining liquid from said opening in said air discharge;
 (g) means interconnected between said liquid control element and said nozzle element for manipulating said liquid control element and said nozzle element with respect to each other for incrementally varying the size of the opening between said liquid control surfaces during the operation of the nozzle assembly;
 (h) said nozzle element being fixed with respect to said housing, said liquid control element being threadedly carried by said nozzle element; and
 (i) motor means for rotating said control element with respect to said nozzle element.

10. A nozzle assembly for generating an aerosol mixture of air and a liquid comprising:
 (a) a source of air under pressure;
 (b) a housing into which said air under pressure is introduced, said housing having an aperture through which the mixture of air and liquid is discharged;

(c) a nozzle element in said housing adjacent to said aperture, said nozzle element having an axial passageway therethrough and a liquid control surface;

(d) a liquid control element for said nozzle element, said liquid control element having a liquid control surface cooperating with the liquid control surface of said nozzle element and movable with respect to each other for varying the effective opening between the aforesaid control surfaces, said opening providing a pathway for liquid into said passageway of said nozzle element;

(e) a source of liquid under pressure communicating with said opening;

(f) said liquid control element being provided with an air passageway, the discharge end of which is in alignment with the intake end of said axial passageway in said nozzle element, the intake end of said air passageway being in communication with said air under pressure for directing an air discharge from said discharge end through said axial passageway and for entraining liquid from said opening in said air discharge;

(g) means interconnected between said liquid control element and said nozzle element for manipulating said liquid control element and said nozzle element with respect to each other for incrementally varying the size of the opening between said liquid control surfaces during the operation of the nozzle assembly; and (h) said passageway of said nozzle element diverging outwardly and being conical, the air passageway of said liquid control element being aligned coaxially with said axial passageway of said nozzle element, said control surfaces being disposed radially with respect to said passageways, the movability of said elements including said control element being movable with respect to said nozzle element for varying the distance between said control surfaces.

11. The nozzle assembly defined in claim 10 wherein said axial passageway forms an inwardly tapered conical throat for said nozzle element.

12. A nozzle assembly for generating an aerosol mixture of air and a liquid comprising:

(a) a source of air under pressure;

(b) a housing into which said air under pressure is introduced, said housing having an aperture through which the mixture of air and liquid is discharged;

(c) a nozzle element in said housing adjacent to said aperture, said nozzle element having an axial passageway therethrough and a liquid control surface;

(d) a liquid control element for said nozzle element, said liquid control element having a liquid control surface cooperating with the liquid control surface of said nozzle element and movable with respect to each other for varying the effective opening between the aforesaid control surfaces, said opening providing a pathway for liquid into said passageway of said nozzle element;

(e) a source of liquid under pressure communicating with said opening;

(f) said liquid control element being provided with an air passageway, the discharge end of which is in alignment with the intake end of said axial passageway in said nozzle element, the intake end of said air passageway being in communication with said air under pressure for directing an air discharge from said discharge end through said axial passageway and for entraining liquid from said opening in said air discharge;

(g) means interconnected between said liquid control element and said nozzle element for manipulating said liquid control element and said nozzle element with respect to each other for incrementally varying the size of the opening between said liquid control surfaces during the operation of the nozzle assembly;

(h) an air duct supporting said housing and through which said air under pressure passes into said housing, the movability of said elements including said control element being movable with respect to said nozzle element for varying the effective opening between said control surfaces and including a rod passing through and protruding outwardly of said duct; and (i) control means secured to the protruding end of said control rod.

13. The nozzle assembly defined in claim 12 including a threaded block supporting said control element, and a handle for rotating said rod and wherein said control element threadedly engages the threads of said block.

14. The nozzle assembly defined in claim 12 wherein said control means includes a reversible motor for rotating said control rod and wherein said nozzle element is threadedly carried within said housing.

15. The nozzle assembly defined in claim 12 wherein said duct includes a pair of ducts disposed in right angular relationship to each other and wherein said control rod extends axially through one of said ducts and outwardly beyond the side of the other of said ducts and wherein said nozzle assembly is disposed radially across the end of said one of said ducts.

* * * * *